United States Patent
Hsu et al.

(10) Patent No.: US 10,044,536 B2
(45) Date of Patent: Aug. 7, 2018

(54) METHOD AND APPARATUS FOR INDEPENDENT PACKET AND OFDM BOUNDARIES

(71) Applicant: Lilee Systems, Ltd., San Jose, CA (US)

(72) Inventors: Ming Feng Hsu, New Taipei (TW);
Ying Chuan Chen, New Taipei (TW);
Chia Chan Chang, New Taipei (TW)

(73) Assignee: Lilee Systems, LTD, San Jose, CA (US)

(*) Notice: Subject to any disclaimer, the term of this patent is extended or adjusted under 35 U.S.C. 154(b) by 24 days.

(21) Appl. No.: 15/417,026

(22) Filed: Jan. 26, 2017

(65) Prior Publication Data

US 2017/0222844 A1 Aug. 3, 2017

Related U.S. Application Data

(60) Provisional application No. 62/288,433, filed on Jan. 29, 2016.

(51) Int. Cl.
*H04L 25/49* (2006.01)
*H04L 27/26* (2006.01)
*H04L 29/06* (2006.01)
*H04L 12/70* (2013.01)

(52) U.S. Cl.
CPC .......... *H04L 25/49* (2013.01); *H04L 27/2601* (2013.01); *H04L 69/22* (2013.01); *H04L 2012/5652* (2013.01)

(58) Field of Classification Search
CPC ..... H04L 25/49; H04L 27/2601; H04L 69/22; H04L 2012/5652
See application file for complete search history.

(56) References Cited

U.S. PATENT DOCUMENTS

2009/0274222 A1* 11/2009 Morelli ............... H04L 27/2655
375/260
2012/0140726 A1* 6/2012 Moon ..................... H04B 7/155
370/329

* cited by examiner

*Primary Examiner* — Duc C Ho
(74) *Attorney, Agent, or Firm* — Blairtech Solution LLC (57) ABSTRACT

Methods and apparatus are disclosed for data packetizing in an orthogonal frequency division multiplexing (OFDM) system. In order to improve transmission efficiency, the present invention uses independent packet and OFDDM block boundaries. Therefore, a packet is allowed to go across the OFDM block boundary and packed into two OFDM blocks. To indicate the start of each packet, a Frame Delimiter (FD) with a predefined format is inserted in front of each packet. The predefined format of the FD can be a predefined bit pattern or modulation points of modulation constellation. Idle data can also be inserted into OFDM blocks when no packet is ready. When data of one or more packets and idle data contain the predefined bit pattern of the FD, the data are modified to avoid generating the pre-defined bit pattern.

14 Claims, 7 Drawing Sheets

Prior Art

*Fig. 3*

*Prior Art*

METHOD AND APPARATUS FOR INDEPENDENT PACKET AND OFDM BOUNDARIES

CROSS REFERENCE TO RELATED APPLICATIONS

The present invention claims priority to U.S. Provisional Patent Application No. 62/288,433, filed on Jan. 29, 2016, entitled "Method and Apparatus for Independent Packet and OFDM Boundaries". The U.S. Provisional Patent Application is hereby incorporated by reference in its entirety.

FIELD OF THE INVENTION

The present invention relates to data packetization in digital communication systems. In particular, the present invention relates to packetize data into orthogonal frequency division multiplexing (OFDM) blocks with independent packet and OFDM boundaries.

BACKGROUND

Orthogonal frequency division multiplexing (OFDM) technique is used in communication systems to transmit digital signals via multiple sub-carriers. The given bandwidth of an OFDM system, shared by all users and the base station, is divided into equal space narrow-bands. Each sub-carrier carries one portion of user data within each narrow-band. In OFDM system, data are divided into frames for transmission. Each frame is further divided into sub-frames or slots and allocated to users and base stations.

Figure 1:
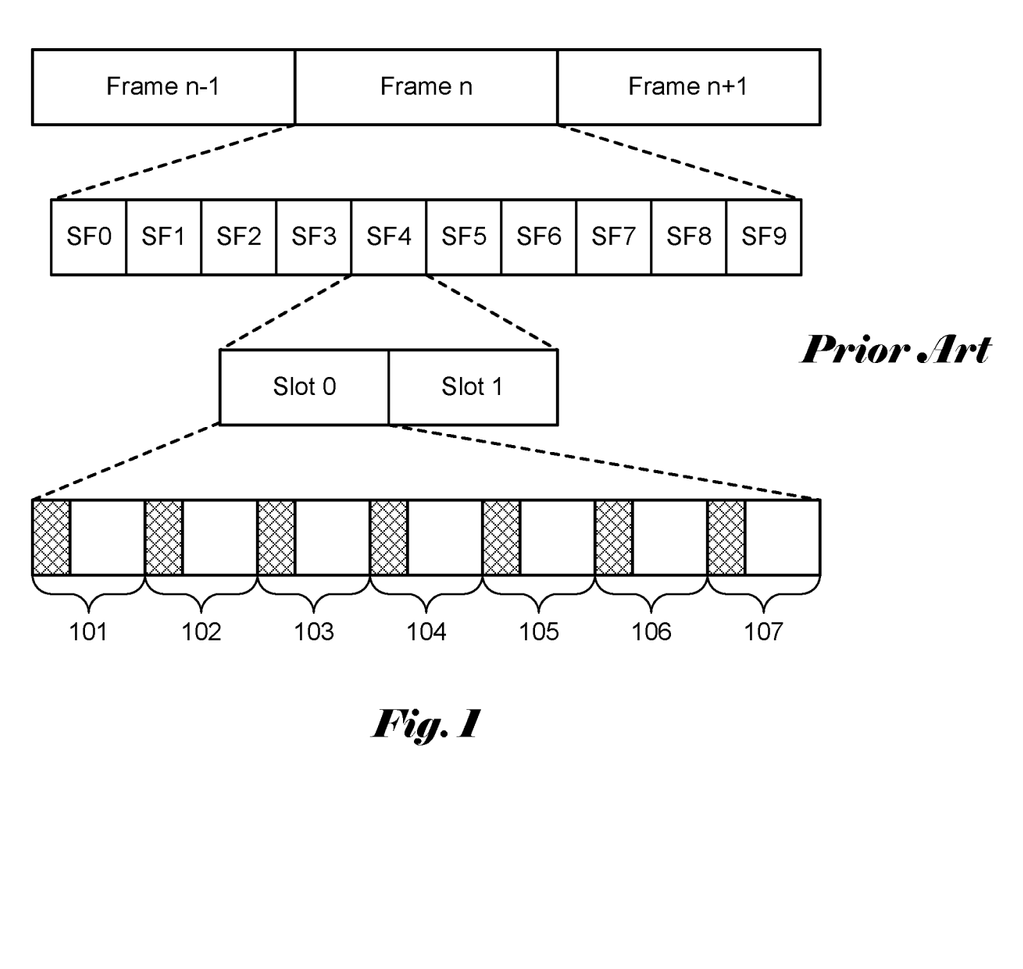
FIG. 1 illustrates an exemplary OFDM frame structure using time division duplex (TDD) configuration.

FIG. 1 illustrates an exemplary frame structure in TDD mode of OFDM communication. The data are divided into multiple 10 ms long frames for transmission. Each frame is further divided into ten sub-frames with each sub-frame length is 1 ms. For example, Frame n contains 10 sub-frames as illustrated by SF0 to SF9. The ten sub-frames include downlink, uplink sub-frames and special sub-frames. Each sub-frame contains two 0.5 ms long slots. For example, sub-frame SF4 is divided into two slots (i.e., Slot 0 and Slot 1). Each slot consists of seven OFDM blocks and each OFDM block consists of a group of OFDM symbols. The length of each OFDM block is about 71.4 µs. The seven OFDM blocks of Slot 0 are illustrated by blocks 101 to 107. Each OFDM block starts with a cyclic prefix illustrated by the shadow area in FIG. 1.

Figure 2:
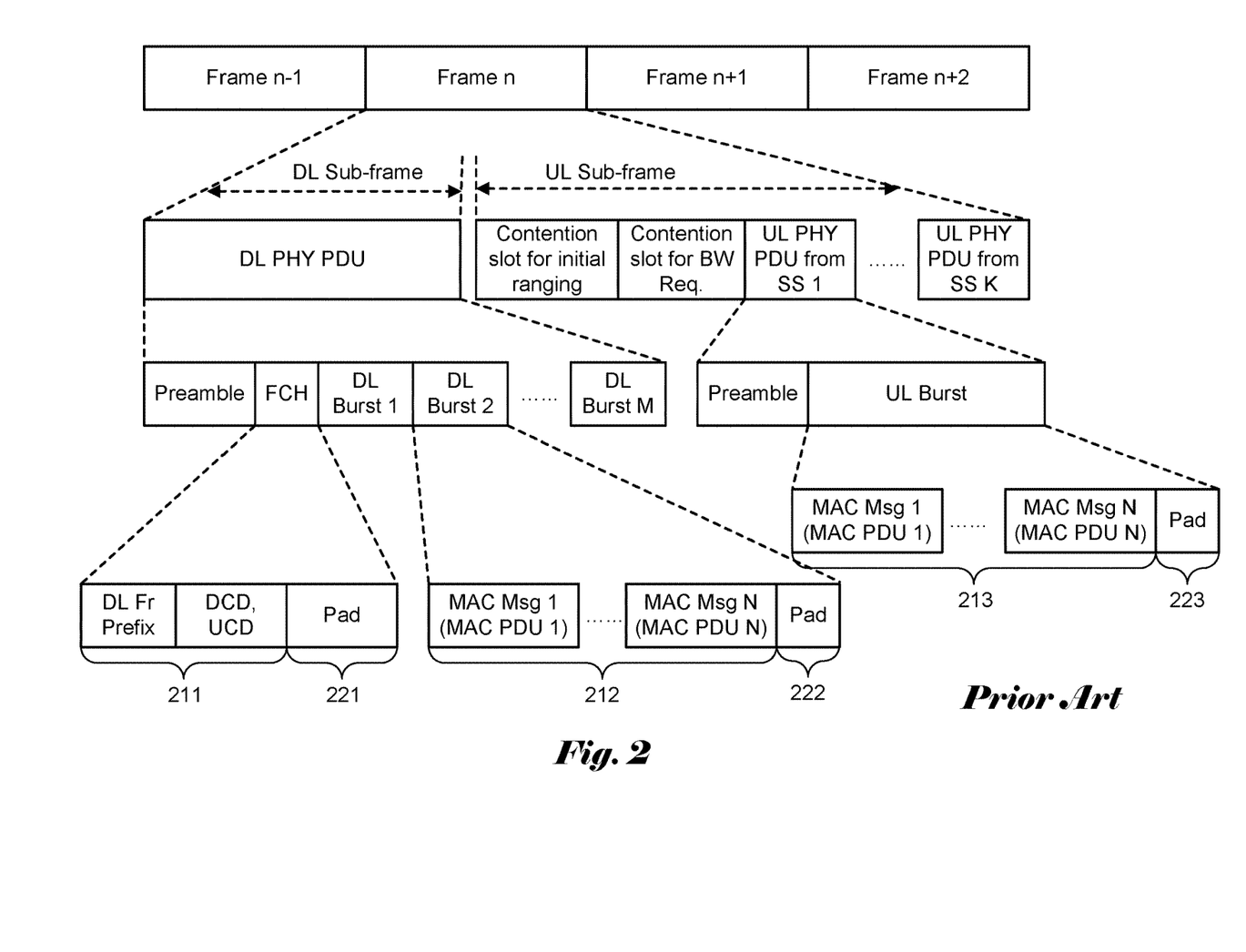
FIG. 2 illustrates an exemplary sub-frame structure of one OFDM frame.

To prepare for transmission, user data and control information are encapsulated into frames to fit physical layer (PHY) protocol. FIG. 2 shows an exemplary frame structure of an OFDM frame to further illustrate structure of physical layer protocol data units (PHY PDUs). Each frame, such as frame n, is divided into downlink (DL) and uplink (UL) sub-frames separated by transition gaps. Each DL sub-frame consists of only one physical layer (PHY) protocol data unit (PDU). The DL PHY PDU starts with a preamble followed by a frame control header (FCH), and one or more DL bursts. Each UL sub-frame consists of a contention slot for initial ranging, a contention slot for bandwidth requests and one or more PHY PDUs. An UL PHY PDU is made of a preamble followed by an UL burst. As shown in FIG. 2, a DL or UL burst payload carries multiple medium access control messages (MAC Msgs), i.e. MAC PDUs.

In OFDM communication, data of each frame are transmitted block by block. The preamble in each DL or UL PHY PDU consists of an integer number of OFDM symbols. The FCH in the DL PDU is one OFDM symbol long. To form an integer number of OFDM blocks for transmission, the payload of each burst is usually padded by dummy bits. As shown in FIG. 2, packet 211 is padded by dummy bits of pad 221 to form an integer number of OFDM symbols. Similarly, packet 212 and packet 213 are also padded with pad 222 and pad 223, respectively.

Figure 3:
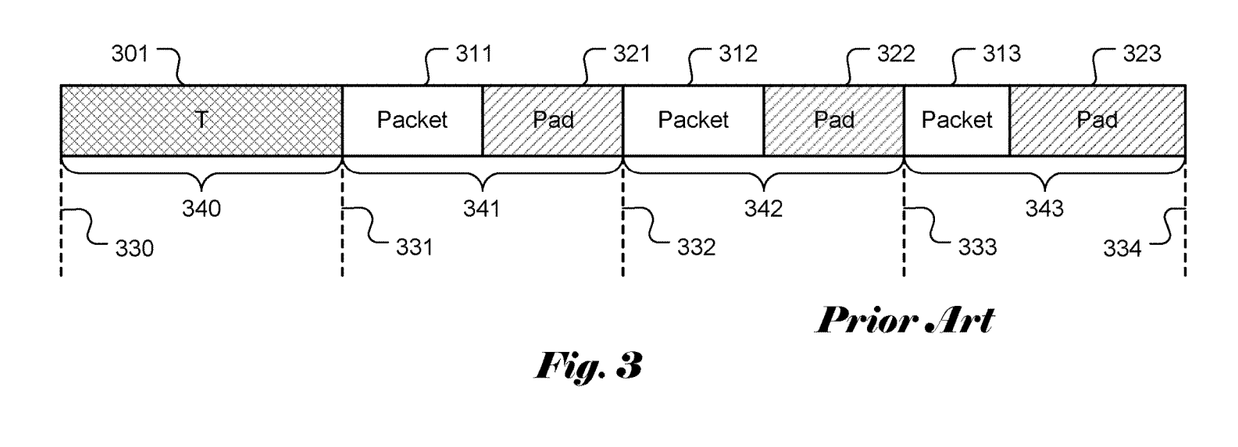
FIG. 3 illustrates exemplary data packetization with each packet is padded to align with the boundary of OFDM block.

Data packetization for OFDM communication according to the existing standard requires the packet boundary being aligned with the OFDM block boundary. No packet is allowed to cross the OFDM block boundary. FIG. 3 shows an example method of packetizing data in a PHY PDU with dummy bits to fit in an integer number of OFDM blocks for transmission. Preamble 301 contains a training sequence inserted into the beginning of the OFDM blocks. The training sequence is one or more OFDM symbols long and filled up OFDM block 340 from OFDM boundary 330 to OFDM boundary 331. Packet 311 is the first packet of the PHY PDU and packetized in OFDM block 341. In order to fill up OFDM block 341 for transmission, pad 321 is inserted after packet 311 until the dummy bits reaches OFDM block boundary 332. Packet 312 is packetized into the next OFDM block and pad 322 is used to align with OFDM block boundary 333. Similarly, Pad 323 is added after packet 313 to reach OFDM block boundary 334.

By using the packetization method illustrated in FIG. 3, each OFDM block only contains data of one packet, and the remaining part after the packet is padded by dummy bits. Since the dummy bits contains no data information, the transmission efficiency decreases with the increasing of the dummy bits.

BRIEF SUMMARY OF THE INVENTION

In the present invention, embodiments of a data packetization method are disclosed for communication in Orthogonal Frequency Division Multiplexing (OFDM) system. In one embodiment of the present invention, the method comprises packetizing input data into one or more packets when input data arrive, and filling up OFDM blocks for transmitting. To fill up each current OFDM block, the method determines whether there is a part of existing packet remaining from one previous OFDM block. If there is a remaining part of existing packet left, the remaining part of the existing packet is inserted into the beginning part of the current OFDM block. Then the current OFDM is checked to determine whether it is full or not. If the current OFDM block is not full, the method then determines whether a new packet is ready. If the new packet is ready, a Frame Delimiter (FD) is signaled in the current OFDM block and the new packet is inserted after the FD is signaled. Then, the method repeats the above steps from determining whether the current OFDM block is full. If the new packet is not ready, idle data are added into the current OFDM block until the new packet is ready or the current OFDM block is full. If the current block is full, the current OFDM block is ready for transmission.

The FD may be signaled in the current OFDM block by inserting a pre-defined bit pattern to the current OFDM block. The OFDM system may modify data of one or more packets and the idle data inserted into the current OFDM block to avoid generation of the predefined bit pattern. The FD may be designed to consist of 63 consecutive ones followed by a single zero. If data associated with one or more packets and the idle data have 62 consecutive ones, a zero may be inserted after the 62 consecutive ones to avoid generating the predefined bit pattern. The FD may be signaled in the current OFDM block by using modulation points of modulation constellation for the FD different from modulation points of modulation constellation for packet data and idle data. The OFDM system may insert a preamble including a training sequence into at least one OFDM block.

In one embodiment of the present invention, an apparatus is provided for data packetization in a communication system using Orthogonal Frequency Division Multiplexing (OFDM). The apparatus comprises one or more electronic circuits or processors arranged to packetize input data into one or more packets when input data arrive. For each current OFDM block, if there is a part of existing packet remaining from one previous OFDM block, the remaining part of the existing packet is inserted into the beginning part of the current OFDM block. Then, the apparatus is configured to determine whether the current OFDM block is full. If the current OFDM block is not full, the apparatus is configured to further determine whether a new packet is ready. If the new packet is ready, a Frame Delimiter (FD) is signaled in the current OFDM block and the new packet is inserted into the current OFDM block after the FD is signaled. The apparatus is configured to repeat the above steps from determining whether the current OFDM block is full. If the new packet is not ready, idle data are added into the current OFDM block until the new packet is ready or the current OFDM block is full. When the current OFDM block is full, the apparatus is configured to transmit the current OFDM block.

In another embodiment of the present invention, a method of data unpacking for a communication system using OFDM technology is disclosed. For each current OFDM block, whether there is a part of existing packet remaining from one previous OFDM block is determined. If there is a part of existing packet remaining, the remaining part of the existing packet is extracted from the beginning part of the current OFDM block. After extracting the remaining part, the method further determines whether data in the current OFDM block are all extracted. If data in the current OFDM block are not all extracted, the method continues detecting a Frame Delimiter (FD) in the remaining frame of the current OFDM block. When the FD is detected, a new packet from the current OFDM block is extracted and the step of determining whether data in the current OFDM block are all extracted is repeated. After all data in the OFDM block are extracted, extracted data of one or more new packets for the current OFDM block are outputted.

Said detecting the FD in the current OFDM block may correspond to detecting a pre-defined bit pattern in the current OFDM block. The FD may consist of 63 consecutive ones followed by a single zero. If data of one or more packets and idle data have 62 consecutive ones, a zero may be inserted after the 62 consecutive ones to avoid generating the predefined bit pattern. Accordingly, at the receiver side, if the OFDM system receives data associated with one or more packets and the idle data having 62 consecutive ones followed by a zero, a bit corresponding to the zero is deleted. Said detecting the FD in the current OFDM block may correspond to detecting modulation points of modulation constellation for the FD different from modulation points of modulation constellation for packet data and idle data.

In another embodiment of the present invention, an apparatus is provided for data unpacking in a communication system using Orthogonal Frequency Division Multiplexing (OFDM). The apparatus comprises one or more electronic circuits or processors arranged to receive one or more OFDM blocks. For each current OFDM block, if there is a part of existing packet remaining from one previous OFDM block, the remaining part of the existing packet is extracted from the beginning part of the current OFDM block. Then, the apparatus is configured to determine whether data of the current OFDM block are all extracted. If the data of the current OFDM block are not all extracted, the apparatus is configured to detect a Frame Delimiter (FD) in a remaining frame of the current OFDM block. When the FD is detected, the apparatus is configured to extract a new packet from the current OFDM block and repeat the above steps from determining whether data in the current OFDM block are all extracted. The apparatus is also configured to output the extracted data of one or more new packets for the current OFDM block.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

As mentioned above, data packetization according to existing OFDM communication systems requires the packet boundary to be aligned with the OFDM block boundary. In particular, the packet boundary is not allowed to go across the OFDM boundary. As a result, dummy data are often required to be inserted into an OFDM block to fill up unused OFDM block. Therefore, the transmission efficiency is degraded due to the required boundary alignment between packets and OFDM blocks.

In order to improve the transmission efficiency, efficient data packetization techniques are disclosed in the present invention, where the efficient data packetization techniques use independent packet and OFDM block boundaries. Therefore, embodiments according to the present invention do not need to pad each packet with dummy bits to fill up the OFDM blocks. By reducing the dummy bits of padding field, the transmission efficiency of OFDM communication systems can be improved. In the present invention, a packet may go across the boundary of an OFDM blocks so that part of the packet is in one OFDM block and remaining part of the packet in another OFDM block. In other words, an OFDM block may contain a fractional packet. Accordingly, data of more than one packet (e.g., one and half packets or two packets) can be packed into one OFDM block for transmission. Since the receiver does not know the packet boundaries, a Frame Delimiter can be inserted at the transmitter side before a packet to inform the receiver about the start of a new packet. The format of each frame delimiter can be any predefined format, such as a predefined bit pattern or predefined modulation points of modulation constellation.

Figure 4:
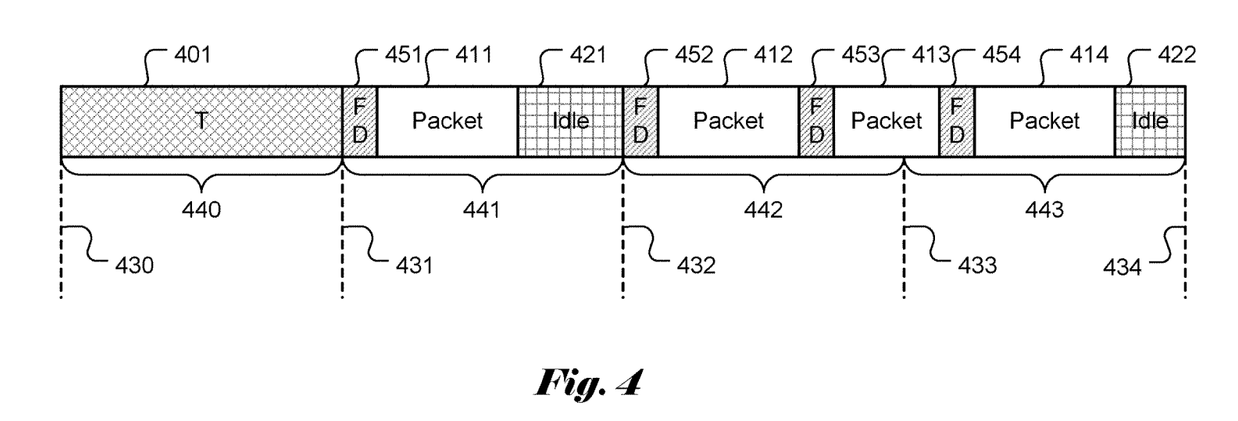
FIG. 4 illustrates exemplary data packetization by inserting a Frame Delimiter (FD) in front of each packet according to one embodiment of the present invention.

FIG. 4 shows an exemplary data packetization for a sub-frame or slot in a OFDM system according to one embodiment of the present invention. The sub-frame or slot consists of four OFDM blocks in which user data and control information are packetized into four packets inserted in three OFDM blocks. Preamble 401 includes a training sequence and consists of an integer number of OFDM symbols. Preamble 401 is inserted in the beginning of the OFDM blocks and filled up OFDM block 440. Then, user data and control information packets are packetized and inserted into the OFDM blocks after the preamble.

In this embodiment, there is no need to pad the packets with dummy data to align the packet boundaries with the OFDM block boundaries. A Frame Delimiter (FD) is inserted before each packet to indicate the start of the packet. As shown in FIG. 4, FD 451 is inserted in OFDM block 441 after preamble 401 to indicate the start of packet 411. Similarly, FD 452, FD 453 and FD 454 are also inserted before packet 412, packet 413 and packet 414, respectively. Packet 413 is packetized into OFDM blocks 442 and 443 across OFDM block boundary 433. When the receiver detects a predefined pattern of the FD, it can determine the start of a packet.

In the present invention, idle data or padding bits can also be added into OFDM blocks. As shown in FIG. 4, idle data 421 is padded with dummy bits after packet 411 before the packet 412 is ready for packetizing. At the end of packet 414, there is no data left for the sub-frame or slot. Idle data 422 is inserted in OFDM block 443 to reach OFDM boundary 434 so that OFDM block is filled up for transmission. The receiver can determine whether the data belongs to a packet or idle data by detecting the predefined pattern of the FD.

Figure 5A:
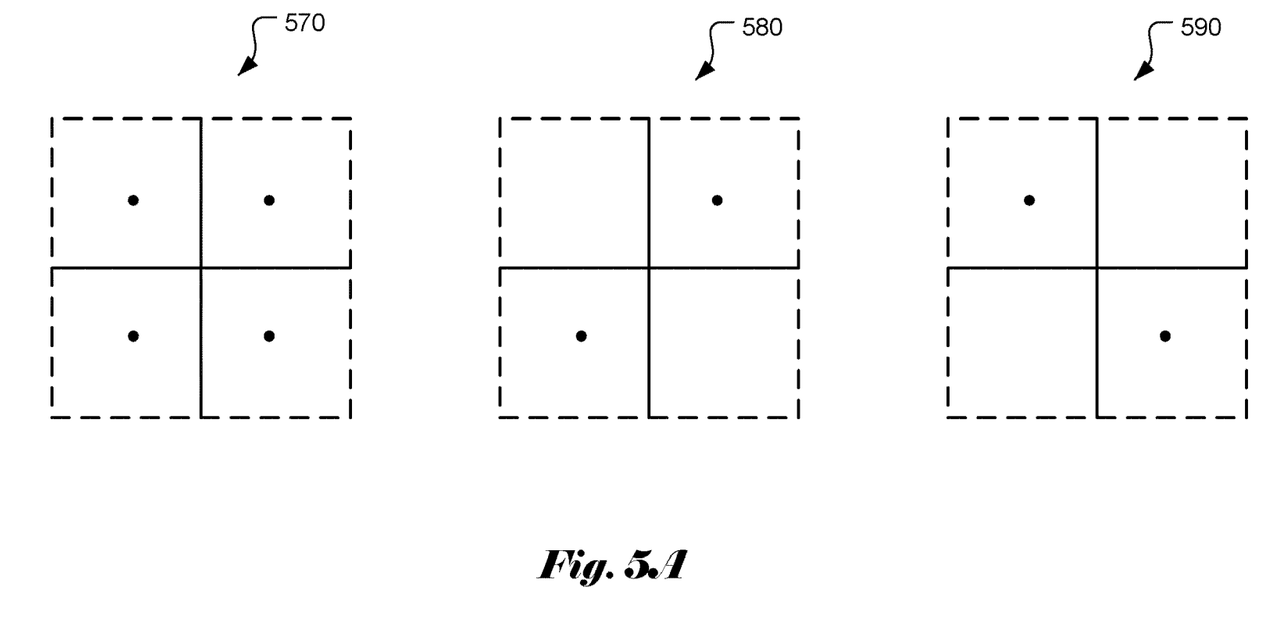
FIG. 5A illustrates exemplary modulation constellation diagrams for the packet, the idle and the FD with different design of modulation points.

In one embodiment of the present invention, the predefined format of the FD is a design of modulation points of modulation constellation different from the packet and the idle. FIG. 5A illustrates exemplary constellation diagrams designed for the FD, the packet and the idle. Constellation diagram 570 is the packet modulation constellation diagram with four modulation points. Constellation diagram 580 is the idle modulation constellation diagram with two modulation points. To avoid false alarms, the modulation constellation diagram of the FD is designed with a different pattern. As shown in FIG. 5A, constellation diagram 590 is the FD modulation constellation diagram with two modulation points designed different from the pattern of the idle modulation points. By detecting the pattern of the modulation points, the receiver can distinguish the FD from the packet data and the idle data.

In another embodiment of the present invention, the FD is a predefined bit pattern. When a packet or idle data contains the same sequence of the FD, it will result in a false alarm of a new packet in the receiver side. To avoid the false alarms, the frame delimiter is designed to be a bit pattern not often occurred in data of packets and idle data sequences. To avoid data in any packet and idle data containing the bit pattern of the FD, a single zero or one is inserted to change the bit pattern. In one example of the present invention, the FD is designed to be a sequence of 63 consecutive ones followed by a single zero.

Figure 5B:
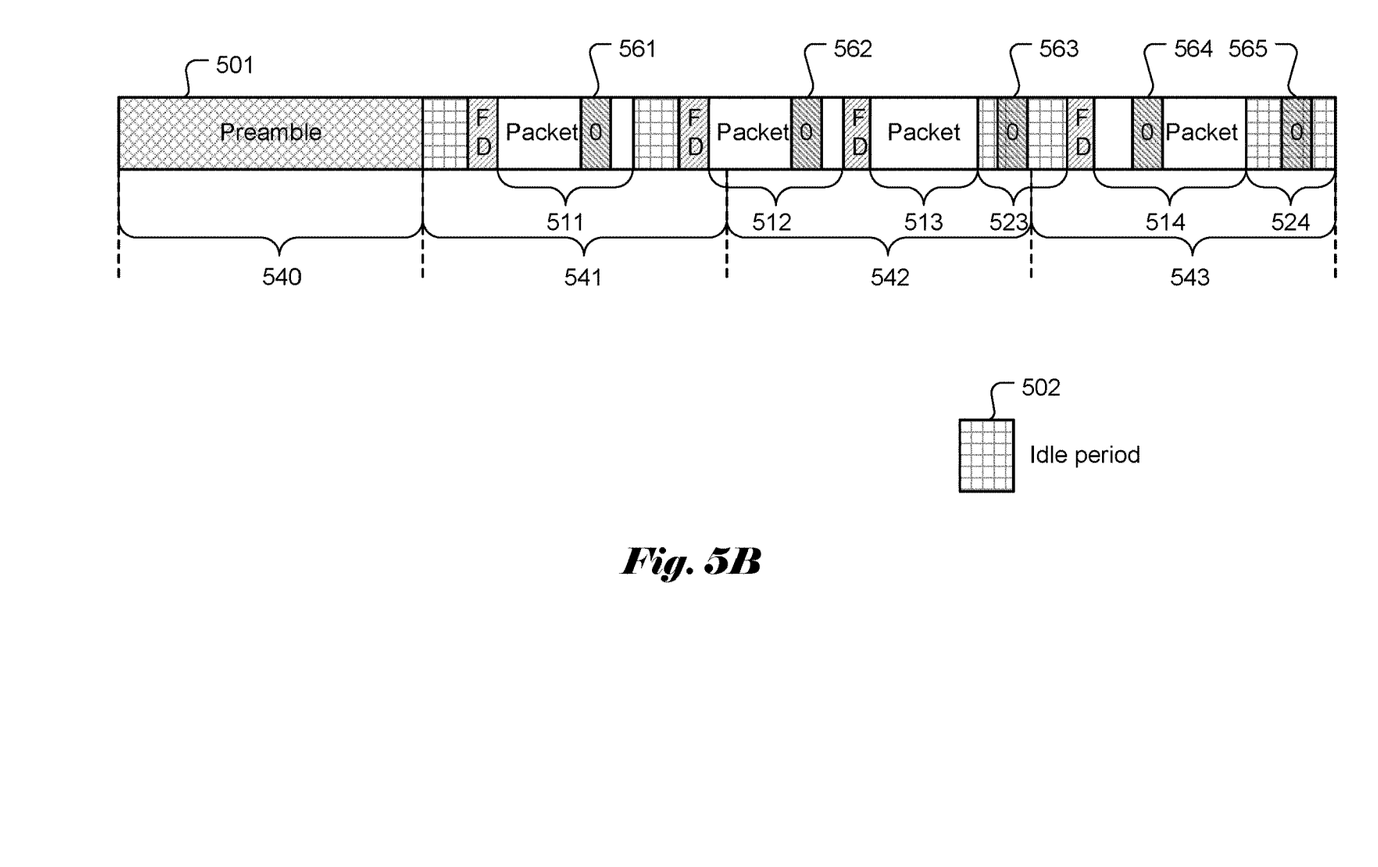
FIG. 5B illustrates exemplary data packetization to avoid generating a same bit pattern as the FD in data associated with the packet and idle data according to one embodiment of the present invention.

FIG. 5B illustrates an exemplary data packetizing of a sub-frame or slot with four OFDM blocks. The user data and control information are packetized into four packets and inserted in three OFDM blocks for transmission. Preamble 501 is inserted in the beginning of the sub-frame or slot and filled up OFDM block 540. Packet 511 is inserted in OFDM block 541. Packet 512 and packet 513 are tightly packetized into OFDM blocks 541 and 542. Before incoming data of packet 514 is ready, idle data 523 is inserted across OFDM block boundary between OFDM block 542 and 543. Idle data 524 is added to the end of packet 514 to fill up the last OFDM block.

In this example, the FD consists of 63 consecutive ones followed by a single zero. To avoid forming the same pattern of the FD in each packet or idle data, a single zero is inserted after 62 consecutive ones. In the receiver side, the dummy 0 inserted after 62 consecutive ones will be discarded during demodulation.

In the example shown by FIG. 5B, each of packet 511, packet 512, packet 514, idle data 523 and idle data 524 contains a sequence of 62 consecutive ones. To avoid the same sequence with the FD, a single "0" is inserted after each 62 consecutive ones in a packet. When idle data contain a sequence of 62 consecutive ones, a single "0" is also inserted after the 62 consecutive ones. As shown in FIG. 5B, single zero-bit 561 is inserted into packet 511 after a pattern of 62 consecutive ones occurs. Similarly, single zero-bits 562 and 564 are inserted after each 62 consecutives ones in packets 512 and 514. As shown in FIG. 5B, idle data 523 and idle data 524 also have single "0" inserted after 62 consecutive ones. When a sequence across a packet and idle data boundary contains a pattern of 62 consecutive ones, a single "0" can also be inserted after the 62 consecutive ones to avoid false alarm of a packet start.

Figure 6:
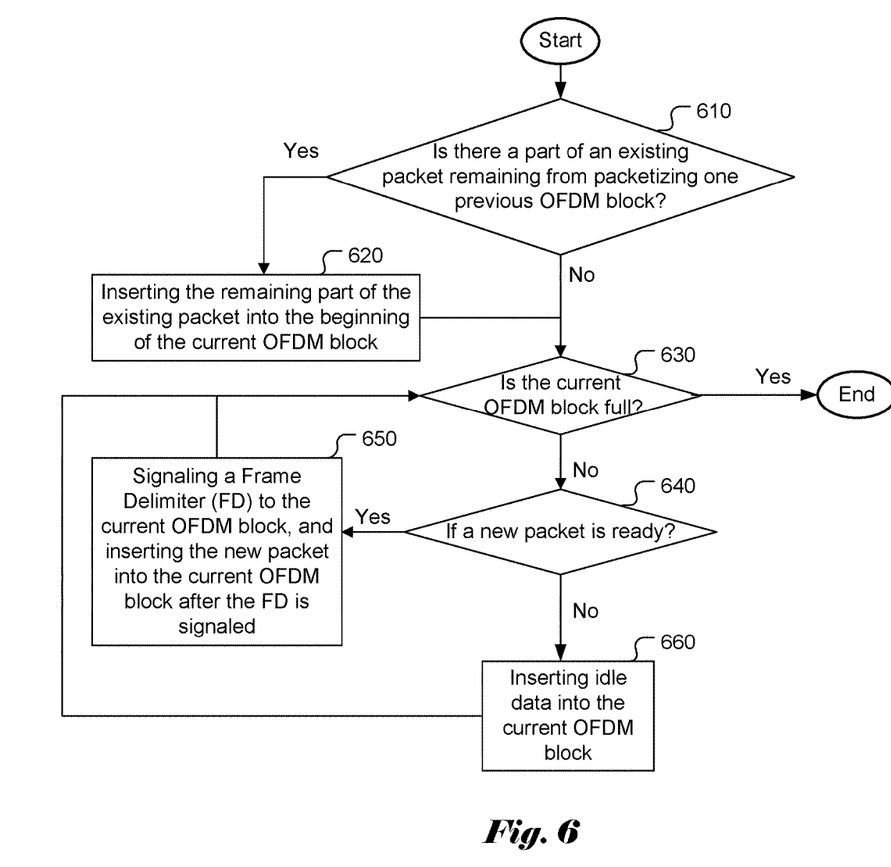
FIG. 6 illustrates an exemplary flow chart of data packetization for each OFDM block according to one embodiment of the present invention.

FIG. 6 illustrates a flow chart of data packetizing for each OFDM block of a frame after packetizing input data into one or more packets when input data arrive. Step 610 determines whether there is a part of existing packet remaining from one previous OFDM block. If there is a part of existing packet left, the remaining part of the existing packet is inserted into the beginning part of the current OFDM block in step 620. In step 630, the current OFDM is determined whether it is full or not. If the current OFDM block is not full, step 640 is used to determine whether a new packet is ready. If the new packet is ready, a Frame Delimiter (FD) is signaled in the current OFDM block and the new packet is inserted after the FD is signaled in step 650. Then, the system repeats step 630 to determine whether the current OFDM block is full. If the new packet is not ready, idle data are added into the current OFDM block in step 660 until the new packet is ready or the current OFDM block is full. If the current block is full, the current OFDM block is ready for transmission.

Figure 7:
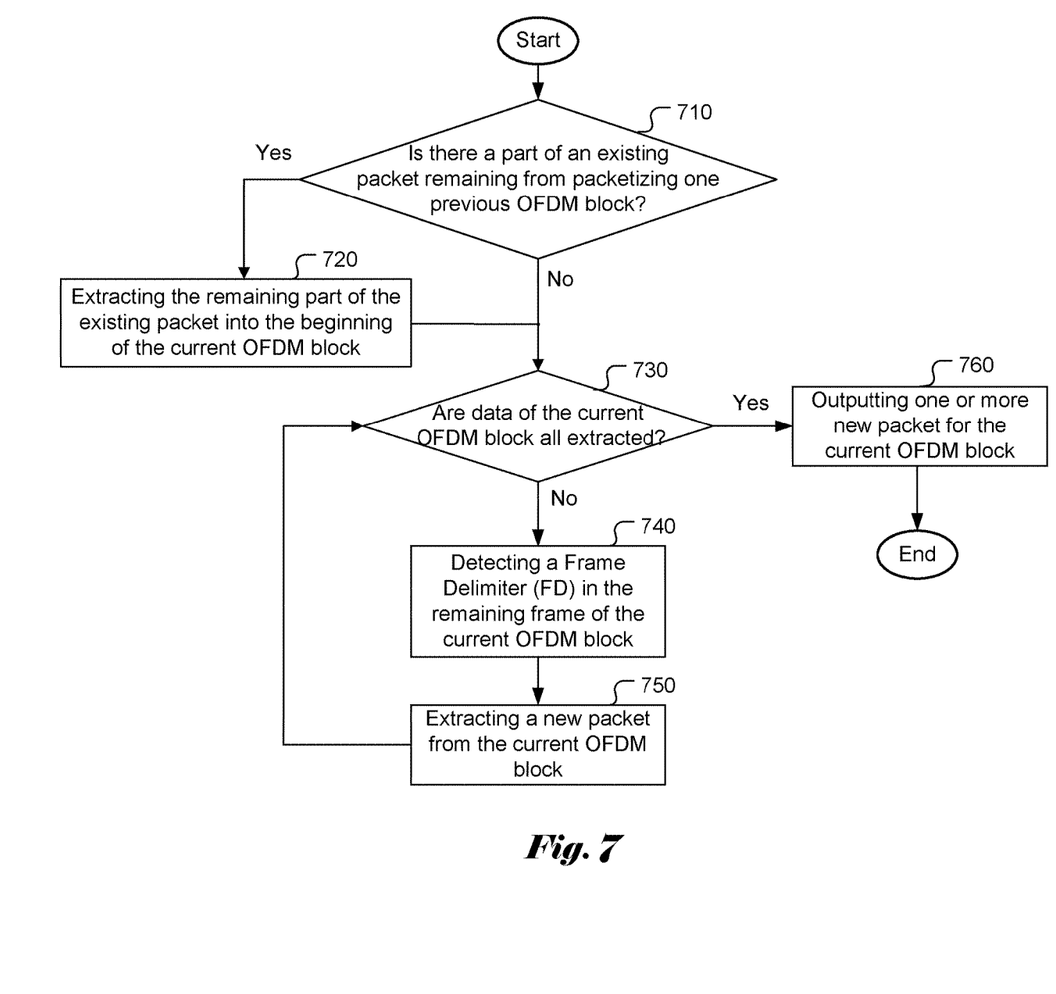
FIG. 7 illustrates an exemplary flow chart of data unpacking for each OFDM block according to one embodiment of the present invention.

FIG. 7 illustrates a flow chat of data unpacking for each OFDM block in a communication system using OFDM technology after receiving one or more OFDM blocks. Step 710 is used to determine whether there is a part of existing packet remaining from one previous OFDM block. If there is a part of existing packet remaining, the remaining part of the existing packet is extracted from the beginning part of the current OFDM block in step 720. Step 730 is used to determine whether data in the current OFDM are all extracted. If data in the current OFDM block are not all extracted, step 740 is used to detect a Frame Delimiter (FD) in the remaining frame of the current OFDM block. When the FD is detected, data of a new packet are extracted from the current OFDM block in step 750. If data in the current OFDM block are not all extracted. The system keeps detecting for a FD and extracting data for a new packet. If all data of the current OFDM block are extracted, one or more new packets for the current OFDM block is output in step 760. While the flow chart in FIG. 7 shows the extracted packets are outputted after all data in a current OFDM block are extracted, a packet may be outputted whenever it is extracted from the OFDM.

The flowcharts shown are intended to illustrate an example of data packetizing before transmission and unpacking after received according to the present invention. A person skilled in the art may modify each step, re-arranges the steps, split a step, or combine steps to practice the present invention without departing from the spirit of the present invention. In the disclosure, examples are used to illustrate embodiments of the present invention. A skilled person may practice the present invention by substituting FD with equivalent packet start indicator and modified data to avoid false alarm of a packet boundary without departing from the spirit of the present invention.

Embodiment of the present invention as described above may be implemented in various hardware, software codes, or a combination of both. For example, an embodiment of the present invention can be a circuit integrated into a wireless receiver chip or program codes integrated into wireless receiver software to perform the processing described herein. An embodiment of the present invention may also be program codes to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware codes may be developed in different programming languages and different format or style. The software code may also be compiled for different target platform. However, different code formats, styles and languages of software codes and other means of configuring code to perform the tasks in accordance with the invention will not depart from the spirit and scope of the invention.

The invention claimed is:

1. A method of data packetization for a communication system using Orthogonal Frequency Division Multiplexing (OFDM) technology, the method comprising:
packetizing input data into one or more packets when input data arrive;
for each current OFDM block:
when there is a part of existing packet remaining from one previous OFDM block, inserting remaining part of the existing packet into a beginning part of the current OFDM block;
determining whether the current OFDM block is full;
when the current OFDM block is not full:
when a new packet is ready: signaling a Frame Delimiter (FD) in the current OFDM block; inserting the new packet into the current OFDM block after the FD is signaled; and repeating said determining whether the current OFDM block is full;
when the new packet is not ready, adding idle data into the current OFDM block until the new packet is ready or the current OFDM block is full; and
when the current OFDM block is full, transmitting the current OFDM block.

2. The method of claim 1, wherein said signaling the FD in the current OFDM block corresponds to inserting a pre-defined bit pattern to the current OFDM block.

3. The method of claim 2, wherein data associated with said one or more packets and the idle data inserted into the current OFDM block are modified to avoid generation of the pre-defined bit pattern.

4. The method of claim 2, wherein the FD consists of 63 consecutive ones followed by a single zero.

5. The method of claim 4, wherein data associated with said one or more packets and the idle data have 62 consecutive ones, a zero is inserted after said 62 consecutive ones in the current OFDM block.

6. The method of claim 1, wherein said signaling the FD in the current OFDM block corresponds to using modulation points of modulation constellation for the FD different from modulation points of modulation constellation for packet data and idle data.

7. The method of claim 1, wherein a preamble including a training sequence is inserted into at least one OFDM block.

8. An apparatus of data packetization for a communication system using Orthogonal Frequency Division Multiplexing (OFDM), the apparatus comprising one or more electronic circuits or processors arranged to:
packetize input data into one or more packets when input data arrive;
for each current OFDM block:
when there is a part of existing packet remaining from one previous OFDM block, insert remaining part of the existing packet into a beginning part of the current OFDM block;
determine whether the current OFDM block is full;
when the current OFDM block is not full:
when a new packet is ready: signal a Frame Delimiter (FD) in the current OFDM block; insert the new packet into the current OFDM block after the FD is signaled; and repeat an above step to determine whether the current OFDM block is full;
when the new packet is not ready, add idle data into the current OFDM block until the new packet is ready or the current OFDM block is full; and
when the current OFDM block is full, transmit the current OFDM block.

9. A method of data packetization for a communication system using Orthogonal Frequency Division Multiplexing (OFDM) technology, the method comprising:
receiving one or more OFDM blocks;
for each current OFDM block:
when there is a part of existing packet remaining from one previous OFDM block, extracting remaining part of the existing packet from a beginning part of the current OFDM block;
determining whether data in the current OFDM block are all extracted;
when data in the current OFDM block are not all extracted:
detecting a Frame Delimiter (FD) in a remaining frame of the current OFDM block;
when the FD is detected: extracting a new packet from the current OFDM block and repeating said determining whether data in the current OFDM block are all extracted; and
outputting extracted data of one or more new packets.

10. The method of claim 9, wherein said detecting the FD in the current OFDM block corresponds to detecting a pre-defined bit pattern in the current OFDM block.

11. The method of claim 10, wherein the FD consists of 63 consecutive ones followed by a single zero.

12. The method of claim 11, wherein when data associated with said one or more packets and idle data have 62 consecutive ones followed by a zero, a bit corresponding to the zero is deleted.

13. The method of claim 9, wherein said detecting the FD in the current OFDM block corresponds to detecting modulation points of modulation constellation for the FD different from modulation points of modulation constellation for packet data and idle data.

14. An apparatus of data packetization for a communication system using Orthogonal Frequency Division Multiplexing (OFDM), the apparatus comprising one or more electronic circuits or processors arranged to:
receive one or more OFDM blocks;
for each current OFDM block:
    when there is a part of existing packet remaining from one previous OFDM block, extract remaining part of the existing packet from a beginning part of the current OFDM block;
    determine whether data in the current OFDM block are all extracted;
    when data in the current OFDM block are not all extracted:
        detect a Frame Delimiter (FD) in a remaining frame of the current OFDM block;
        when the FD is detected: extract a new packet from the current OFDM block and repeat an above step to determine whether data in the current OFDM block are all extracted; and
outputting extracted data of one or more new packets.

* * * * *